United States Patent Office  3,275,260
Patented Sept. 27, 1966

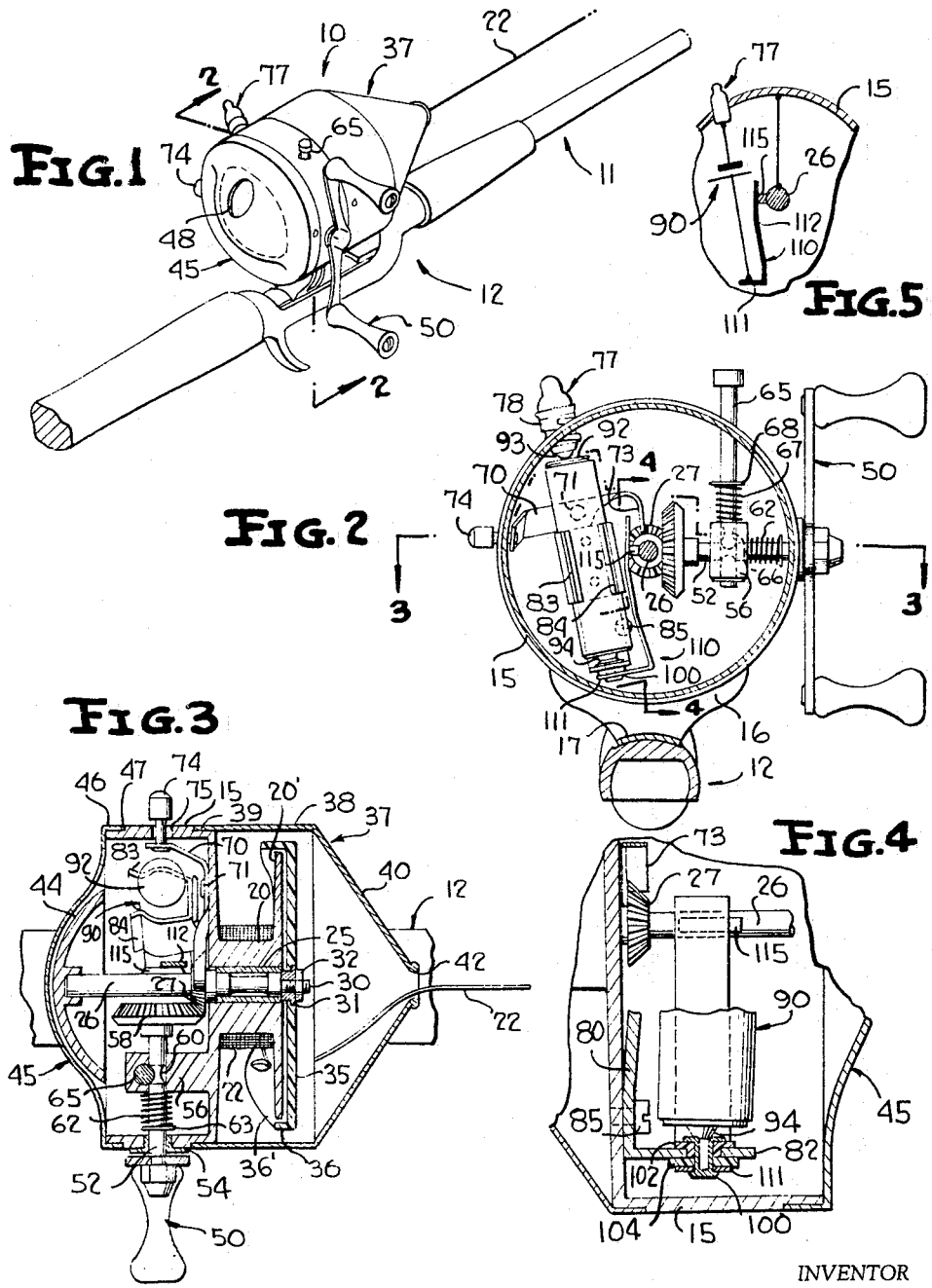

3,275,260
INDICATING MECHANISM FOR FISHING ROD REELS
Otis S. Woollen, Wapella, Ill.
Filed Nov. 14, 1963, Ser. No. 323,676
3 Claims. (Cl. 242—84.2)

The present invention relates to indicating mechanism for fishing rod reels, and more particularly to an indicating mechanism which provides a fisherman with a visible indication that the line is being paid out so that he is instantly advised when a fish has taken the bait and is pulling on the line.

It is evident that the visible indicating means of the present invention may be utilized either during the day or at night, and that the indicating means may be of particular value in the dark when it may be difficult for the fisherman to otherwise determine that the line is being paid out.

Various devices have been designed in the prior art for the same general purpose, but these prior art devices have suffered from the disadvantage that in order to operate the visible indicating means, it is necessary to either increase the drag on the fishing line ,or it may be necessary to operate the audible click mechanism such that energization of the visible indicating portion is accompanied by mechanical clicks.

In many instances, it is desirable that the paying out of the line not be accompanied by the mechanical clicking noise, and in certain instances it is essential that the fishing reel provide a minimum of resistance to paying out of the fishing line since certain types of fish will not strike the line if there is any substantial resistance, but will merely play with it.

Accordingly, an important and essential feature of the present invention is an arrangement whereby the visible indicating mechanism is operable completely independently of the conventional mechanism associated with such fishing reels for producing drag or a mechanical clicking.

In other words, the indicating means of the present invention is fully operable without requiring any mechanical clicks and furthermore, the construction is such that substantially no resistance to paying out of the line is afforded by the indicating mechanism itself.

Prior art arrangements for providing a visible indicating means have incorporated complex mechanical arrangements which unnecessarily complicate the structure of the fishing reel and additionally add substantially to the manufacture and cost thereof. In contrast, the arrangement of the present invention is very simple and compact enabling the structure of the present invention to be incorporated in a conventional fishing reel with a minimum of difficulty and without changing the arrangement of the basic components of the fishing reel construction. Only certain minor modifications of present fishing reels need be made to incorporate the indicating means of the present invention, and the cost of manufacture is thereby reduced to a minimum.

An object of the present invention is to provide new and novel indicating mechanism for fishing rod reels which provides a visible indicating portion to advise a fisherman instantly upon paying out of the fishing line.

Another object of the invention is the provision of indicating mechanism for fishing rod reels which is substantially completely silent in operation and which does not require any mechanical clicking noise.

A further object of the invention is to provide indicating mechanism for fishing rod reels wherein the indicating mechanism itself provides substantially no resistance to paying out of the fishing line.

Still another object of the invention is to provide indicating mechanism for fishing rod reels which is quite simple, compact and inexpensive in construction, and yet which is quite efficient and reliable in operation.

Other objects and many attendant advantages of the invention will become more apparent when considered in connection with the specification and accompanying drawings, wherein:

FIG. 1 is a top perspective view illustrating a fishing rod reel incorporating the present invention mounted upon a fishing rod;

FIG. 2 is a sectional view taken substantially along line 2—2 of FIG. 1 looking in the direction of the arrows;

FIG. 3 is a sectional view taken substantially along line 3—3 of FIG. 2 looking in the direction of the arrows;

FIG. 4 is a sectional view taken substantially along line 4—4 of FIG. 2 looking in the direction of the arrows; and FIG. 5 is a schematic view illustrating in a diagrammatic manner the electrical circuit of the present invention.

Referring now to the drawings wherein like reference characters designate corresponding parts throughout the several views, there is shown in FIG. 1 a fishing rod reel 10 according to the present invention and a conventional fishing rod indicated generally by reference numeral 11. The fishing rod includes a handle portion 12, the reel being mounted in a conventional well known manner upon the fishing rod.

Referring now particularly to FIGS. 2–4 inclusive, the details of construction of the reel itself will be more clearly understood. A housing or body means 15 is formed of a suitable electrically conductive metallic material and includes an integral outstanding flange portion 16 which extends outwardly of the generally cylindrical main portion of the body means, flange portion 16 having secured to the outer end thereof a foot member 17 of generally arcuate cross-sectional configuration which is adapted to fit about a portion of the outer surface of the handle of the fishing rod, the foot member being utilized for holding the reel in operative position.

As seen particularly in FIG. 3, a line spool means 20 is formed on the main housing 15, a disc-like flange portion 20' being provided at the outer longitudinal end portion of the line spool means 20 for retaining the fishing line 22 in its stored position on the line spool means.

It will be noted that a central bore is formed through the line spool means and a suitable bearing member 25 is mounted within this bore. The bearing member 25 is of generally cylindrical configuration and receives therewithin a shaft 26 which is thereby rotatably supported by the housing, shaft 26 having a bevel gear 27 rigidly affixed thereto.

Shaft 26 includes a reduced end portion 30 which is threaded, a member 31 being clamped on the threaded end portion of the shaft by means of a nut 32 threaded onto the threaded end portion. A pick-up means 35 is secured to portion 31 and is affixed thereto such that the pick-up means is fixed for rotation with the end portion of shaft 26. Pick-up means 35 includes a laterally extending peripheral flange portion 36 having a tapered arcuate edge portion 36', this type of pick-up means being of conventional well known construction, it being understood that the fishing line 22 is normally in engagement with a portion of the peripheral edge 36 of the pick-up means.

A cover member 37 includes a substantially cylindrical portion 38 which is snugly received on a peripherally recessed portion 39 of the housing, the cover member being held in position by a conventional bayonet slot arrangement. Cover member 37 also includes a generally frustoconical portion 40 which extends outwardly and tapers inwardly to define at the apex portion thereof an opening 42 through which the fishing line is adapted to freely travel.

A member 44 of substantially dome-shaped cross-sectional configuration is fixed to the opposite end of shaft 26 and comprises a drag member. A cover member 45 includes a substantially cylindrical flange portion 46 which is adapted to be received snugly by a peripherally recessed portion 47 of the body means, cover member 45 also being held in operative position by a conventional bayonet slot arrangement. Cover member 45 is provided with an opening 48 in the upper portion thereof as seen most clearly in FIG. 1, this opening being so positioned that the fisherman can readily place his thumb in position to extend through the cutout portion 48 of the cover member into contact with the arcuate surface of the drag member 44. By adjusting the amount of pressure applied to member 44, a selective amount of drag may be manually applied to the shaft 26 fixed to member 44 and in turn to the pick-up means 37. In this manner, the fisherman can control the rate at which the line pays out of the reel as desired.

The manual operating means for selectively retrieving the fishing line includes a conventional crank handle 50 which is secured to the outer end of an operating shaft 52. Shaft 52 is rotatably supported by a first bearing member 54 fitted within a suitable opening provided in body means 15, shaft 52 also being rotatably as well as longitudinally supported within a suitable bore provided in a wall portion 56 formed integral with the body means. A bevel gear 58 is rigidly secured to the opposite end of the shaft 52 and is adapted to be moved into and out of meshing engagement with the cooperating gear 27.

Shaft 52 is provided with a reduced portion 60, and further a compression string 62 is seated between the wall portion 56 of the body means and a spring clip 63 which is secured in a suitable groove provided in the operating shaft. It will be apparent that spring 62 normally tends to bias the operating shaft along with the crank handle 50 on the bevel gear 58 in a direction outwardly of the body means so as to disengage gear 58 from gear 27.

A detent mechanism for retaining the operating shaft in its position for providing driving engagement between gears 58 and 27 may be most clearly seen in FIG. 2 and includes a cylindrical shaft portion 65 which is slidably positioned within a bore which extends at substantially right angles to the bore which receives the shaft 52, and the bores are slightly offset with respect to one another such that the shaft portion 65 is adapted to travel up and down with respect to the shaft 52. Shaft 65 includes a reduced portion 66 as seen in FIG. 2, this reduced portion being adapted to cooperate with the reduced portion 60 of shaft 52 as hereinafter described. A compression spring 67 is seated between the upper surface of the wall portion 56 and a spring clip 68 secured in a suitable groove provided in the shaft portion 65 of the detent means. Accordingly, the detent means is normally urged in an upward direction by means of spring 67, and in this upward position, the reduced portions on the shafts 52 and 65 are not aligned with one another whereby a cylindrical portion of shaft 65 fits within the reduced portion 60 of shaft 52 as seen in FIG. 3 holding the shaft 52 in its position whereby gear 58 meshes with gear 27.

Upon downward movement of shaft 65 against the force of spring 68, the reduced portions 66 and 60 of the shafts 65 and 52 respectively are aligned with one another, thereby enabling spring 62 to force shaft 52 outwardly to disengage gear 58 from gear 27. It is accordingly apparent that the operating means can be selectively engaged and disengaged with the shaft and pick-up means as required.

A click mechanism includes an arm 70 formed of a thin metallic strip, the arm being pivotally supported by a rivet or the like 71 secured to the body means, the arm including a depending resilient finger portion 73 which is adapted to engage between the teeth of the bevel gear 27 whereby rotation of the bevel gear will cause the well known click sound associated with such mechanisms. An operating button 74 is secured to the opposite end of the arm portion 70 and extends through a suitable opening 75 formed in the side wall of the housing. The arm 70 may be moved to an operative or inoperative position in a well known manner by pivoting the arm about its supporting pivot point 71 so as to move the finger 73 into or out of engagement with the bevel gear as desired.

The indicating means includes an electrically operated bulb member indicated generally by reference numeral 77, this bulb including a conventional threaded base portion 78 which is threaded into a suitable opening provided in the wall of the housing 15. By so threading the bulb into the housing, the bulb is firmly anchored and supported in its operative position and is also electrically connected with the electrically conductive material of the housing.

A support bracket is provided for supporting the source of electrical energy in the form of a battery, the bracket including a portion 80 extending generally parallel with the adjacent wall of the housing, a base portion 82 extending substantially normally from the lower end of portion 80. A pair of resilient spring-like arm portions 83 and 84 extend outwardly from portion 80 and are adapted to encompass and clamp the battery therebetween to support the battery in operative position. Portion 80 is supported on the adjacent wall of the housing by means of screw means 85 extending into suitable openings provided in these members.

The battery is indicated generally by reference numeral 90 and is substantially cylindrical in configuration, the battery defining at the opposite ends thereof a pair of terminals. The upper face 92 of the battery defines a first terminal in engagement with the lower contact end 93 of the bulb 77. The lower terminal 94 of the battery is in turn in contact with a metallic electrically conductive rivet-like member 100 which is supported by a pair of insulating members 102 and 104 within a central opening provided in the base portion 82 of the bracket member.

A contact arm is indicated generally by reference numeral 110 and includes a lower leg portion 111 which is operatively connected with member 100 as seen in FIGS. 2 and 4, the contact arm also including an upwardly extending portion 112.

Shaft 26 is provided with a radially outwardly extending protuberance 115 which may be either formed integral with the shaft or as a separate member, portion 115 being adapted to engage the portion 112 of the contact arm as illustrated in FIGS. 2 and 3. The protuberance on the shaft 26 is illustrated in the figures as being in engagement with the contact arm, but it should be understood that this situation exists only in certain relative positions of the shaft 26 with respect to the housing 15. In other words, when the protuberance 115 is diametrically opposite to the position shown in the drawings, it will be out of contact with portion 112 of the contact arm, and the portion 112 of the contact arm will also be spaced from the shaft 26 so that there is no electrical contact therebetween. The arrangement is such that protuberance 115 is in contact with the contact arm during rotation of shaft 26 through an angle of slightly less than 180°, there being no electrical contact whatsoever between portion 112 of the contact arm and shaft 26 during the remaining rotation thereof during its remaining rotation with respect to the housing.

It is apparent from the foregoing that when the line 22 is being paid out from the reel upon a strike by a fish, the pick-up means as well as the shaft 26 will be continuously rotated. Continuous rotation of the shaft 26 will produce intermittent contact with the portion 112 of the contact arm, and this intermittent contact will in turn cause intermittent energization of the bulb 77.

Inspection of FIG. 5 shows to illustrate the manner in which the circuit is closed through the bulb. It will be noted that the bottommost portion of the bulb is in engagement with one terminal of the battery, while the contact arm 112 is electrically connected with the opposite terminal of the battery. Upon engagement of the protuberance 115 with portion 112 of the contact arm, the circuit will be closed back to the base portion of the bulb through the electrical connection provided by the metallic engagement between the shaft 26 and its associated components which in turn are in engagement with portions of the housing 15.

It is apparent that intermittent energization of the bulb 77 will provide the fisherman with a ready visible indication that the line is being paid out. It is evident that the indicating mechanism is completely silent and is absolutely independent of the click mechanism. Accordingly, the visual indicating means is operative in a silent manner and provides substantially no resistance in itself to paying out of the line. If it should be desired to employ the click mechanism simultaneously with the visual indicating means, this can of course also be done. It is further apparent that the construction of the present invention is quite simple, compact and inexpensive, and enables ready modification of present-day existing fishing reels to incorporate the arrangement of the present invention. The indicating mechanism of the present invention is furthermore quite efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. Indicating mechanism for fishing rod reels comprising body means formed of electrically conductive material, said body means including line spool means for receiving a fishing line, a shaft rotatably supported by said body means, pick-up means operatively connected with said shaft and disposed adjacent said line spool means and adapted to engage a fishing line for retrieving a line after it has been paid out, operating means movably supported by said body means and means for operatively connecting said operating means with said shaft for producing rotation of the shaft and pick-up means, indicating means including an electrically illuminable means supported by an electrically connected with said body means, support means connected with said body means and disposed adjacent said line spool means, a source of electrical energy supported by said support means and having a pair of terminals, one of said terminals being directly connected with said electrically illuminable means, a contact arm operatively connected with the other of said terminals, said contact arm including an extending portion disposed adjacent a part of said shaft and normally spaced therefrom, said shaft being provided with an outwardly extending portion for directly engaging an intermediate part of said extending portion of the contact arm at certain relative positions of said shaft with respect to said body means and being out of engagement with said extending portion of the contact arm at other relative positions of said shaft with respect to said body means, said shaft and said outwardly extending portion as well as said contact arm all being formed of electrically conductive material, said shaft being electrically connected with said body means and said electrically illuminable means, whereby said illuminable means is intermittently energized and illuminated upon rotation of said shaft with respect to the body means as caused by rotation of said pick-up means as the fishing line is paid out from said line spool means.

2. Apparatus as defined in claim 1 wherein said contact arm is supported by said support means and is normally electrically insulated from said body means.

3. Apparatus as defined in claim 1 wherein said illuminable means comprises an electric light bulb, said electric light bulb threadedly supported within said body means, said source of electrical energy comprising a battery, said bulb including a portion directly engaging an end portion of said battery to provide electrical contact therebetween.

References Cited by the Examiner

UNITED STATES PATENTS

| 2,145,929 | 2/1939 | Herman | 242—84.1 |
| 2,675,193 | 4/1954 | Hull | 242—84.2 |
| 2,798,126 | 7/1957 | Burge | 200—61.39 |
| 2,918,227 | 12/1959 | Mauborgne | 242—84.21 |

FRANK J. COHEN, Primary Examiner.

MERVIN STEIN, Examiner.

B. S. TAYLOR, Assistant Examiner.